(12) United States Patent
Amine et al.

(10) Patent No.: US 7,785,740 B2
(45) Date of Patent: *Aug. 31, 2010

(54) OVERCHARGE PROTECTION FOR ELECTROCHEMICAL CELLS

(75) Inventors: Khalil Amine, Downers Grove, IL (US); Jun Liu, Naperville, IL (US); Krishnakumar Jambunathan, Macungie, PA (US); Brian Keith Peterson, Fogelsville, PA (US); Gennady Dantsin, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 870 days.

This patent is subject to a terminal disclaimer.

(21) Appl. No.: 11/097,810

(22) Filed: Apr. 1, 2005

(65) Prior Publication Data

US 2005/0227143 A1    Oct. 13, 2005

Related U.S. Application Data

(60) Provisional application No. 60/561,193, filed on Apr. 9, 2004.

(51) Int. Cl.
 *H01M 10/056* (2010.01)
(52) U.S. Cl. ................................ 429/199; 429/200
(58) Field of Classification Search ............... 429/188, 429/199, 200, 322, 207
 See application file for complete search history.

(56) References Cited

U.S. PATENT DOCUMENTS

| | | | |
|---|---|---|---|
| 3,551,120 A | 12/1970 | Miller et al. | |
| 4,020,240 A | 4/1977 | Schlaikjer | |
| 4,071,664 A | 1/1978 | Dey | |
| 4,201,839 A | 5/1980 | Johnson et al. | |
| 4,331,743 A | 5/1982 | Dey | |
| 4,849,309 A | 7/1989 | Redey | |
| 4,857,423 A | 8/1989 | Abraham et al. | |
| 4,935,316 A | 6/1990 | Redey | |
| 5,260,148 A | 11/1993 | Idota | |
| 5,736,275 A | 4/1998 | Kaun | |
| 5,763,119 A | 6/1998 | Adachi | |
| 6,004,698 A | 12/1999 | Richardson et al. | |
| 6,180,829 B1 | 1/2001 | Strauss et al. | |
| 6,335,466 B1 | 1/2002 | Strauss et al. | |
| 6,346,351 B1 | 2/2002 | Yde-Andersen et al. | |
| 6,448,447 B1 | 9/2002 | Strauss et al. | |
| 6,511,773 B1 | 1/2003 | Dampler | |
| 6,548,212 B1 | 4/2003 | Heider et al. | |
| 6,781,005 B1 * | 8/2004 | Casteel et al. | 556/7 |
| 7,311,993 B2 * | 12/2007 | Ivanov et al. | 429/121 |
| 2003/0052310 A1 | 3/2003 | Michot et al. | |
| 2003/0091892 A1 | 5/2003 | Watanabe et al. | |
| 2004/0029017 A1 | 2/2004 | Besenhard et al. | |
| 2005/0053841 A1 | 3/2005 | Ivanov et al. | |
| 2007/0134324 A1 | 6/2007 | Messadek | |

FOREIGN PATENT DOCUMENTS

| | | |
|---|---|---|
| CN | 1274962 A | 11/2000 |
| EP | 1 513 215 A2 | 3/2005 |
| EP | 1 679 760 A1 | 7/2006 |
| JP | 5232539 | 3/1977 |
| JP | 53123842 | 10/1978 |
| JP | 1-206571 A | 8/1989 |
| JP | 06-338347 A | 12/1994 |
| JP | 6-338347 A2 | 12/1994 |
| KR | 2002077445 | 10/2002 |
| WO | 98/31065 A1 | 7/1998 |
| WO | 99/09606 A1 | 2/1999 |
| WO | 01/29920 A1 | 4/2001 |
| WO | 2006/007671 A2 | 1/2006 |

OTHER PUBLICATIONS

S. Mori, et al., "Chemical Properties of Various Organic Electrolytes for Lithium Rechargeable Batteries . . . 1. Characterization of Passivating Layer Formed on Graphite in Alkyl Carbonate Solutions", Journal of Power Sources, 68 pp. 59-64 (1997).

D. Aurbach, et al., "Recent Studies on the Correlation Between Surface Chemistry, Morphology, Three-Dimensional Structures and Performance of Li and Li-C Intercalation Anodes in Several Important Electrolyte Systems", Journal of Power Sources 68, pp. 91-98 (1997).

S. Flandrois, et al., "Carbon Materials for Lithium-ion Rechargeable Batteries", Carbon 37, pp. 165-180 (1999).

* cited by examiner

*Primary Examiner*—Gregg Cantelmo
(74) *Attorney, Agent, or Firm*—Michael K. Boyer (57) ABSTRACT

The invention relates to an improvement in a cell which is normally susceptible to damage from overcharging comprised of a negative electrode, a positive electrode, and an electrolyte comprised of an overcharge protection salt carried in a carrier or solvent. Representative overcharge protection salts are embraced by the formula:

$$M_aQ$$

where M is an electrochemically stable cation selected from the group consisting of alkali metal, alkaline earth metal, tetraalkylammonium, or imidazolium groups, and Q is a borate or heteroborate cluster and a is the integer 1 or 2.

15 Claims, 4 Drawing Sheets

OVERCHARGE PROTECTION FOR ELECTROCHEMICAL CELLS

CROSS-REFERENCE TO RELATED APPLICATIONS

This application claims priority to provisional application U.S. Ser. No. 60/561,193 filed Apr. 9, 2004 having the same title, which is incorporated herein by reference.

STATEMENT REGARDING FEDERALLY SPONSORED RESEARCH OR DEVELOPMENT

The United States Government has rights in this invention pursuant to ANL Agreement No. 85N14.

BACKGROUND OF THE INVENTION

Primary and secondary batteries comprise one or more electrochemical cells. Many batteries comprise lithium cells, also known as lithium-ion cells, because of lithium's large reduction potential, low molecular weight of elemental lithium, and high power density. Lithium cells refer to batteries containing metallic lithium as the negative electrode and batteries which contain a lithium ion host material as the negative electrode. For secondary cells, the small size and high mobility of lithium cations allow for the possibility of rapid recharging. These advantages make lithium secondary batteries ideal for portable electronic devices, e.g., cell phones and laptop computers. Recently, larger size lithium batteries are being developed which have application for use in the hybrid electric vehicle market.

In a lithium secondary cell, one of most important concerns is safety and, in particular, the safety problem posed by an overcharge situation, i.e., the application of an overvoltage to a fully charged cell. One danger of overcharging lithium cells employing metal oxide cathodes is that oxygen evolution can occur and create explosive mixtures within the cell. Another danger is that the cell can overheat and cause burns.

In the case of a lithium-based secondary cell, which is of the non-aqueous type, two methods have been developed for dealing with overcharge; one method utilizes a chemical reaction and the other method an electronic circuit. The chemical method has typically involved the addition of a redox shuttle additive also referred to as a reversible oxidation/reduction agent, which is reversibly oxidized just above the fully charged cell voltage. Then, the additive migrates across the electrolyte solution in its oxidized state to the anode where it is reduced back to its original state. Electronic circuits typically disable, sometimes permanently, the battery when activated.

The following patents are representative of lithium secondary batteries and electrochemical cells:

U.S. Pat. No. 5,763,119 discloses non-aqueous lithium secondary cells having overcharge protection. In the background of the patent a technique for preventing the overcharge of the cell using a chemical reaction is suggested wherein it is recommended that a reversible redox agent be added to the electrolyte solution. Fe, Ru and Ce complexes are described as having high oxidation-reduction potential and high electrochemical stability and, therefore, use as reversible oxidation/reduction agents for 4 volt-class lithium-ion secondary cells. The solution for preventing overcharge damage in '119 involved the addition of a substituted benzene, e.g., a dimethoxy fluoro or bromo benzene as a redox shuttle additive in a cell comprised of a metal lithium anode, a lithium cobalt oxide cathode, $LiPF_6$ electrolyte salt and a mixture of propylene carbonate and dimethyl carbonate.

U.S. Pat. No. 6,004,698 discloses a solid polymer electrolyte electrochemical storage cell having an organic redox shuttle additive for overcharge protection based on alkali metal salts of triazoles, imidazoles, pyrazines, cyanobenzenes and substituted 1,2-diones. The threshold potential of these redox shuttle additives typically ranges from 2.5 to 3.3 V.

U.S. Pat. No. 4,201,839 discloses an electrochemical cell based upon alkali metal-containing anodes, solid cathodes, and electrolytes where the electrolytes are closoborane compounds carried in aprotic solvents. Closoboranes employed are of the formula $Z_2B_nX_n$ and $ZCB_mX_m$ wherein Z is an alkali metal, C is carbon, R is a radical selected from the group consisting of organic hydrogen and halogen atoms, B is boron, X is one or more substituents from the group consisting of hydrogen and the halogens, m is an integer from 5 to 11, and n is an integer from 6 to 12. Specifically disclosed examples of closoborane electrolytes employed in the electrochemical cells include lithium octabromooctaborate, lithium decachlorodecaborate, lithium dodecachlorododecaborate, and lithium iododecaborate.

U.S. Pat. No. 6,346,351 discloses electrolyte systems for a rechargeable cell of high compatibility towards positive electrode structures based upon a salt and solvent mixture. Lithium tetrafluoroborate and lithium hexafluorophosphate are examples of salts. Examples of solvents include ethylene carbonate, dimethyl carbonate, propylene carbonate, and so forth. In the background are disclosed known electrolytes for lithium cells, which include lithium perchlorate, lithium hexafluoroarsenate, lithium trifluoromethylsulfonate, lithium tetrafluoroborate, lithium bromide, and lithium hexafluoroantimonate electrolytes incorporated in solvents.

BRIEF SUMMARY OF THE INVENTION

This invention provides an electrochemical cell comprising a negative electrode, a positive electrode, and an electrolyte comprising a salt that provides overcharge protection. The present invention is useful for primary and secondary cells, especially those that are susceptible to damage from overcharging. The salt or salts that provide overcharge protection will also be referred to herein as overcharge protection salt or salts. The electrolyte may comprise only one or more salts that provide overcharge protection, because for those embodiments the overcharge protection salts will also create ions for carrying current. In alternative embodiments, the electrolyte of the cell may further comprise one or more nonreversibly oxidizable salts that create ions for current carrying, but would be susceptible to overcharging without the overcharge protection salt present in the electrolyte or without the provision of some other overcharge protection means for the cell, e.g. redox shuttle additives or electronic circuits. When used with a nonreversibly oxidizable salt, the overcharge protection salt of this invention may contribute to the conductivity of the cell by creating current carrying ions. Typically, an effective amount, which may be determined experimentally, of overcharge protecting salt is added to the cell, if used alone, or if used in combination with a nonreversibly oxidizable salt in the electrolyte of the cell. To allow for the cell to fully charge, the reversible oxidation potential (overcharge protection potential) of the overcharge protection salt should be from 0.1 to 2 volt, or 0.1 to 1 volt, preferably 0.1 to 0.5 volts above the design voltage of the cell. The design voltage of the cell is the maximum voltage that the cell is designed to charge and recharge to.

Salts that provide overcharge protection (also referred to herein as the overcharge protection salt) may be represented by the formula:

$$M_aQ$$

where Q is an anion, M is a cation, which allows Q to be soluble or carried in the carrier in the cell. M may be selected from the group consisting of alkali metal, alkaline earth metal, tetraalkylammonium, or imidazolium, and Q may be a borate or heteroborate cluster and a may be the integer 1 or 2.

In some embodiments, the electrolyte of the cells of this invention may further comprise nonreversibly oxidizable salt in a carrier (solvent) that provides current by the movement of ions across the electrolyte solution/electrode interface. Nonreversibly oxidizable salts include lithium salts, sodium salts and magnesium salts, and the like. For example, a nonreversibly oxidizable lithium salt in a carrier (electrolyte solution) allows lithium ions to move into and out of the electrode materials. In the same way, nonreversibly oxidizable sodium salts are particularly useful in sodium or sodium ion cells, and nonreversibly oxidizable magnesium salts are particularly useful in magnesium or magnesium ion cells. In some embodiments, it is preferred that the overcharge protection salts used with the nonreversibly oxidizable salts have the same cation as the nonreversibly oxidizable salt, and/or the same cation as one or more of the electrodes in the cell.

In one embodiment, the overcharge protecting salt may be provided by a lithium salt, and the nonreversibly oxidizable salt may be a lithium salt, for example lithium hexafluorophosphate, that is typically of low cost. When the electrolyte comprises a nonreversibly oxidizable lithium salt, the cell may be referred to herein as a lithium or lithium-ion cell. The overcharge protection salt acts as a redox shuttle, thereby preventing irreversible electrode reactions on overcharge, thus maintaining capacity and power capability of the cell; and extending the cell's life. The salt that provides overcharge protection can be chosen to have a reversible oxidation potential between 3.2 and 5.0 volts, between 3.8 and 4.8 volts or between 4.2 and 4.6 volts measured relative to lithium.

This invention further provides a method of designing a cell comprising the steps of selecting an overcaharge protection potential; and selecting an overcharge protection salt and a carrier based on said overcharge protection potential. This invention further provides that method further comprising the step of changing the carrier to adjust the overcharge protection potential of said overcharge protection salt. This invention further provides a method of designing a cell further comprising the step of changing the chemical substituents of said overcharge protection salt.

BRIEF DESCRIPTION OF FIGURES

FIG. 2. Chronopotentiometry at 1 mA cm$^{-2}$ for $Li_2B_{12}F_9H_3$ in EC/DEC, EC/PC and EC/DEC/PC FIG. 3. Chronoamperometry at 4.3 V and 80 C in $Li_2B_{12}F_9H_3$ in EC/DEC, EC/PC and EC/DEC/PC FIG. 4. Electrolyte threshold potential as a function of dielectric constant and x in $B_{12}F_xH_{12-x}{}^{2-}$

DETAILED DESCRIPTION OF THE INVENTION

The term "nonreversibly oxidizable salt" or variants thereof refer to salts that when used as the electrolyte in a cell without an overcharge protection salt or other means for overcharge protection are susceptible to detrimental overcharging, because they do not reversibly oxidize or do not reversibly oxidize at a sufficient rate to prevent overcharging.

The terms "battery", "electrochemical cell" and "cell" may be used interchangeably herein, although a battery may comprise one to hundreds or more cells.

A cell is used to generate current by a chemical reaction. Additionally, the electrochemical cells of this invention can be used in batteries, fuel cells and ultracapacitors, for example.

The term "carrier" is used to refer to a single solvent or a mixture of two or more solvents or any other material, for example, a polymer backbone, that dissolves and dissociates the one or more salts in the electrolyte so that the electrolyte contains solvated ions.

The term "electrolyte" means the part of the battery that contains the overcharge protection salts of this invention, optionally including one or more nonreversible oxidizable salts, and optionally including carriers and other additives. Other additives include passive film forming additives, flame retardant additives, other redox shuttle additives.

The term "electrolyte salt" is used to mean a salt or salts that dissociate into current carrying ions and may include nonreversible oxidizable salts and/or the overcharge protection salts of this invention.

The term "electrolyte solution" is used to mean one or more of the overcharge protection salts of this invention dissolved in a carrier, optionally including one or more nonreversible electrolyte salts, and optionally including other additives.

The "threshold potential" means a potential at which an oxidation current starts to flow in cyclic voltammetric experiments. The threshold potential is a useful criteria to know a reversible oxidation/reduction potential.

Cells of the 3 to 5 volt, or the 4 volt class typically operate over a voltage range of about 3.2 to 5 volts. One presently popular lithium ion cell comprises a lithium cobalt oxide cathode and graphite anode and typically operates over a design voltage range from 2.9 to 4.2 volts. After discharge, these cells, if desired, can be recharged. In those cases where the lithium cell includes a non-reversibly oxidized salt, there is an opportunity to overcharge the cell, particularly in those cases where there is an electronic circuit failure. Overcharging the cell, i.e., effecting a voltage continuation of beyond a range of about 0.1 to 2 volt higher than the voltage rating of the cell may result in degradation of the cathode, degradation of the carrier and creation of significant amounts of heat, which may lead to explosive reactions.

Representative nonreversibly oxidizable salts that may be employed in the 3 to 5 volt, and particularly the 4 volt, class of cells include lithium salts, such as lithium perchlorate, lithium hexafluorophosphate, lithium hexafluoroarsenate, lithium trifluoromethylsulfonate, lithium tetrafluoroborate, lithium tetrakis(pentafluorophenyl)borate lithium bromide, lithium hexafluoroantimonate, $LiB(C_6H_5)_4$, $LiN(SO_2CF_3)_2$, $LiN(SO_2CF_2CF_3)$ and lithium bis(chelato)borates such as $Li[(C_2O_4)_2B]$, lithium bis (dicarboxylic acid) borate, $LiBF_3C_2F_5$ and $LiPF_3(CF_2CF_3)_3$ or a mixture of any two or more thereof.

This invention may be described with particular reference to "lithium ion cells" or cells containing a non-reversibly oxidizable lithium salt; however, the overcharge protection provided by the overcharge protection salts of this invention are useful in other electrochemical cells, particularly any cells operating with non-aqueous electrolytes, and/or using the nonreversibly oxidizable salts listed above.

The present invention is directed to an improvement in a cell, that may be a secondary cell, and may be of the 3 to 5 volt class, and particularly the 4 volt class comprised of a negative electrode, a positive electrode, a separator and an electrolyte, said electrolyte comprising an overcharge protection salt, in one embodiment in a carrier. The overcharge protection salt can be used to protect the cell against overcharging and as the electrolyte salt to contribute to the conductivity of the cell. One or more overcharge protection salts can be used in the electrolyte. Alternatively, the electrolyte may further comprise a nonreversibly oxidizable salt. The nonreversibly oxidizable salt is the salt that dissociates into current carrying ions providing little or no ability to reversibly oxidize to prevent overcharging, and the overcharge protection salt will prevent the cell from overcharging during charge or recharge of the cell. Alternatively, the overcharge protection salt and the nonreversibly oxidizable salt may both create current carrying ions, and may both participate in charging and discharging of a cell; however the overcharge protection will be substantially provided by the overcharge protection salt. The overcharge protection salt will be used in the electrolyte in an amount sufficient to offer overcharge protection. For a lithium cell, the anion of the overcharge protection salt is one that typically exhibits reversible oxidation/reduction potential vs. lithium metal between 3.2 and 5.0 volts, preferably between 3.8 and 4.8 volts and more preferably between 4.2 and 4.6 volts. For another type of cell, those values will differ and be relative to the negative electrode material. To prevent detrimental overcharging of the cell, the reversible oxidation/ reduction potential (the overcharge protection potential) should be about 0.1 to 2 V or 0.1 to 1 V, preferably 0.1 to 0.5 volts above the design voltage of the cell. Although the reversible oxidation/reduction potential of the overcharge protection salt may be less than the design voltage of the cell, e.g., 0.1 to 0.3 volts below the design voltage of the cell, it follows that if such salt is used the cell cannot be fully charged.

A typical overcharge condition without overcharge protection results in excess reaction at the cathode which can result in irreversible damage to the cathode. The overcharge protection salt protects against excess reaction at the cathode by being oxidized at a potential that is less than the potential at which irreversible damage to the cathode begins, and preferably at a potential that is above the potential of a fully charged cell. After the overcharge protection salt is oxidized, the oxidized anions are able to migrate to the anode where the overcharge protection salt is reversibly reduced. When the overcharge protection salt is present in sufficient amounts, the redox process is repeated continually during the overcharge condition with an effective shuttle of the oxidized anions moving to the anode and the reduced anions in their original form migrating to the cathode.

Preferred overcharge protection salts are the lithium borate cluster salts and preferably the lithium fluoroborate cluster salts, which have a reversible oxidation potential vs. lithium metal within a range of 3.2 volts and 5 volts. The lithium fluoroborate cluster salts which have a reversible oxidation/ reduction potential between 3.8 and 4.8 volts and some of which have a reversible oxidation/reduction potential of from 4.2 and 4.6 volts are well suited to be used for overcharge protection within 4 volt cells, for example lithium-ion (electrolyte salt) cells. Thus, the lithium salts suited for use as the overcharge protection salts in cells are those selected from the broad range of salts that are reversibly oxidized at a potential slightly above that of the design voltage of the cell. Typically, the reversible oxidation/reduction potential of the salt is from 0.1 to 2 volt and preferably not more that 0.5 volts above the design voltage of the cell. This minimizes the chance for solvent and cathode decomposition and production of explosive mixtures within the cell or battery.

The term "reversibly oxidized or reversibly reduced" and variants thereof are used to define reactions that are reversible or pseudo-reversible or quasi-reversible.

Representative overcharge protection salts, which undergo reversible oxidation/reduction, include those represented by the formula:

$$M_aQ$$

where Q is an anion, M is a cation, which renders the anion Q soluble in solvents. M is selected from the group consisting of alkali metal, alkaline earth metal, tetraalkylammonium, or imidazolium, Q is a monovalent or divalent borate or heteroborate cluster anion, a may be 1 or 2. The overcharge protection salt may act as a supplementary electrolyte salt, for example when M is lithium, the overcharge protection salt acts as a supplementary lithium ion electrolyte in lithium ion cells. Further, for certain overcharge protection salts, a second electrolyte salt is not necessary, meaning that the same salt can be used as the overcharge protection salt and the electrolyte salt. Depending on the application the overcharge protection salt can be used as an additive to the electrolyte or used as both the overcharge protection salt and the electrolyte salt. The overcharge protection salts can be used alone or as mixtures of two or more overcharge ptrotection salts of this invention. The group Q is selected from the following borate (i) and heteroborate (ii and iii) anions i) The closo-borate anion compositions of formula $(B_{8-12}Z_{8-12})^{2-}$, where Z is F, H, Cl, Br, and/or (OR), where R is H, alkyl, fluoroalkyl or aryl. The alkyl, and fluoroalkyl groups may comprise $C_{1-20}$, $C_{1-8}$, or $C_{1-3}$, and if fluorinated may have $F_{1-42}$, groups that are branched, cyclic or straight-chained. The term aryl refers to aromatic ring systems, preferably containing 5 to 20 ring atoms. The compositions are polyhedral clusters consisting of eight to twelve boron atoms where each boron is attached as defined to a hydrogen, a halogen atom, hydroxyl group or alkoxyl group.

ii) The closo-ammonioborate anion compositions of formula: $((R'R''R''')NB_{8-12}Z_{7-11})^{1-}$; where N is bonded to B and each of R', R", R''' is independently selected from the group consisting of hydrogen, alkyl, aryl and/or a polymer, Z is F, H, Cl, Br, or (OR), where R is H, alkyl, fluoroalkyl or aryl. These anion compositions are also polyhedral boron clusters of 8 to 12 boron atoms, where one of the boron atoms is attached to an ammonia group (NR'R''R'''), with F, H, Cl, Br and OR groups attached to the remaining boron atoms. A description of these compositions may be found in U.S. Pat. No. 6,335, 466 B1. U.S. Pat. No. 6,335,466 is incorporated herein by reference. The alkyl, and fluoroalkyl groups may comprise $C_{1-20}$, $C_{1-8}$, or $C_{1-3}$, and if fluorinated may have $F_{1-42}$, groups that are branched, cyclic or straight-chained. The term aryl refers to aromatic ring systems, preferably containing 5 to 20 ring atoms. Polymers include polystyrene, polyethylene, polyethylene glycol and the like, which allow the anions to be bound to a polymeric support.

iii) The closo-monocarborate anion compositions of formula: $(R''''CB_{7-11}Z_{7-11})^{1-}$, where R'''' is bonded to C and selected from the group consisting of hydrogen, alkyl, cycloalkyl, aryl, and a polymer; Z is F, H, Cl, Br, and/or (OR), where R is H, alkyl, fluoroalkyl, or aryl. These fluorinated closo-monocarborate anion compositions are also polyhedral clusters that comprises 7-11 boron atoms and a single carbon atom. Such anion compositions are described in U.S. Pat. No. 6,130,357. U.S. Pat. No. 6,130,357 is incorporated herein by reference. The alkyl, and fluoroalkyl groups may comprise $C_{1-20}$, $C_{1-8}$, or $C_{1-3}$, and if fluorinated may have $F_{1-42}$, groups that are branched, cyclic or straight-chained. The term aryl refers to aromatic ring systems, preferably containing 5 to 20 ring atoms. Polymers include polystyrene, polyethylene, polyethylene glycol and the like, which allow the anions to be bound to a polymeric support.

Specific examples of metal borate and heteroborate compounds include $Li_2B_{10}H_{0-7}Z_{10}$ where Z is Cl, OR. Typically, the representative compounds are $Li_2B_{10}Cl_{10}$, $Li_2B_{10}OH_{1-5}Cl_{5-9}$, $Li_2B_{10}Cl_{5-9}(OR)_{1-5}$, $Li_2B_{10}H_2Cl_8$, $Li_2B_{10}H_{0-7}(OCH_3)_3$, $Li_2B_{10}Cl_8(OH)_2$, $Li_2B_{10}Br_{10}$, $Li_2B_8Br_8$, $Li_2B_{12}Cl_{12}$, and $Li_2B_{12}I_2$. Examples with other cations include $Na_2B_{10}Cl_8(OH)_2$, $NaLiB_{10}H_2Cl_2$, $(Me_4N)_2B_{12}Cl_{12}$, and $MgB_{10}Cl_{10}$.

Some emobodiments of the overcharge protection salts, which exhibit reversible oxidation/reduction, are lithium fluoroborates represented by the formulas:

$$Li_2B_{10}F_xZ_{10-x}$$

and $$Li_2B_{12}F_xZ_{12-x}$$

wherein x is at least 1, or at least 3 for the decaborate, or at least 5, or at least 8, for the dodecaborate salts. Z represents H, Cl, Br, or OR, where R=H, $C_{1-8}$, preferably $C_{1-3}$ alkyl or fluoroalkyl. The subscript x can be 4 to 12, 7 to 12 or 7 to 11, and mixtures of salts having x values from 4 to 12, 7 to 12 or 7 to 11. The most preferred compounds are $Li_2B_{12}F_{12}$, and $Li_2B_{12}F_xZ_{12-x}$ where x is 6, 7, 8, 9, 10, 11 and 12 or where x is 7, 8, 9, 10 and 11 and mixtures of $Li_2B_{12}F_xZ_{12-x}$ where x is 6, 7, 8, 9, 10, 11 and 12 or where x is 7, 8, 9, 10 and 11. For example, a mixture of $Li_2B_{12}F_8H_4$ salt means $Li_2B_{12}F_xH_{12-x}$ where x is predominantly 8 with lesser amounts of x=6, 7, 9, 10, 11, and 12.

The subscripts "10-x" and "12-x" mean "10 minus x" and "12 minus x" respectively. All other subscripts with the "-" indicate a range, e.g 1-3 means 1 through 3.

Specific examples of lithium fluoroborate compounds include $Li_2B_{12}F_{8-12}Z_{0-4}$ where Z is Cl, Br, or OR where R is $C_{1-8}$, preferably $C_{1-3}$. Typically, the salts include $Li_2B_{10}F_{10}$, $Li_2B_{12}F_{12}$, $Li_2B_{12}F_{10-12}(OH)_{0-2}$, $Li_2B_{12}F_{10-12}(Cl)_2$, $Li_2B_{12}F_{8-10}(H)_{0-2}$, $Li_2B_{12}F_{8-12}(OCF_3)_{0-4}$, and $Li_2B_{10}F_{8-10}Br_{0-2}$.

It was discovered that the overcharge protection salts of this invention are reversibly oxidized at a potential that changes with the dielectric constant of the carrier, and/or with the chemical substitution on the overcharge protection salt. In some embodiments, the change in the threshold potential is significant, i.e. for every unit increase in the dielectric constant, the threshold potential increases by 1 mV or greater, or 2 mV or greater, or 4 mV or greater, or 6 mV or greater or 15 mV or greater. These increases in the threshold potential were determined for dielectric constants between 15 to 100. The overcharge protection salts and optionally the carrier can be tailored to the cell design. The threshold potential and overcharge protection potential (oxidation/reduction potential) of the overcharge protection salt are determined by the chemical substitution on the overcharge protection salt (borate cluster salt), as well as the solvation energy of the ions in the electrolyte which is a function of the carrier. For example, the presence of hydrogen or OH groups on the overcharge protection salt tend to lower the threshold potential and overcharge protection potential (oxidation/reduction potential) as compared to the same overcharge protection salt substituted with one or more fluorine atoms instead of hydrogen or OH groups. Alternatively an overcharge protection salt of this invention substituted with chlorine atoms or O-fluoroalkyl instead of hydrogen or OH groups or fluorines can increase the threshold potential and overcharge protection potential (oxidation/reduction potential) of the overcharge protection salt in the electrolyte. Additionally, the use of the decaborate salts verses the dodecaborate salts can provide differing threshold potentials and overcharge protection potentials (oxidation/reduction potentials).

Another factor in the overcharge protection salt selection resides in electrolyte design due to the differences in the viscosity of the overcharge protection salt and the optional nonreversably oxidizable salt in the carrier of the electrolyte. For example, lithium chloroborates tend to impart higher viscosities to the electrolyte solution than do the lithium fluoroborates.

A feature of the overcharge protection salts of this invention is that the potential at which the overcharge protection salts of this invention are reversibly oxidized is a function of the dielectric constant of the carrier. The overcharge protection can be tuned to occur at different potentials, depending on cell design, by selecting carriers of different dielectric constants and/or viscosities. The dielectric constants and viscosities may to a certain degree be related, that is, typically but not always, the higher the dielectric constant of the solvent, the higher the viscosity. The dielectric constant and viscosity of the carrier (solvent(s)) influences the solvation of the overcharge protection salt(s) and its(their) solvation energies. Higher solvation energy could result in a lower rate constant for the reversible oxidation reaction, which shifts the threshold potential higher. If the carrier is a single solvent then the dielectric constant for the carrier can be approximated by using the dielectric constant of that solvent. The carrier may be a mixture of two or more solvents. Carriers with different dielectric constants can be obtained by mixing solvents of different dielectric constants at different ratios. To allow for full charge of the cell, the overcharge protection potential should be from 0.1 to 2 volt, or from 0.1 to 1 volt or preferably 0.1 to 0.5 volts above the design voltage of the cell. Moreover, to minimize lowering of cell capacity, the threshold potential of the overcharge protection salt should be above the design voltage of the cell, preferably greater than or equal to about 0.1 V above the design voltage of the cell. The solvents (carrier) can be chosen such that the threshold potential of the overcharge protection salt is above the design voltage of the cell and such that the overcharge protection salt provides overcharge protection between 0.1 to 2 volts, or between 0.1 to 1 volt or preferably 0.1 to 0.5 volts above the design voltage of the cell.

We have determined that a simple test to determine whether a salt has reversible overcharge protection (oxidation/reduction) characteristics and assist in the design of the lithium cell involves running cyclic voltammetric scans on a lithium salt in a standard electrolyte solvent (EC/DMC in a 3:7 weight ratio) using a Pt working electrode vs. a lithium reference electrode. For other salts and cells, other reference electrodes should be used. We have determined that a particularly useful salt will exhibit an oxidation current at a suitable overcharge protection potential, e.g., from 0.1 to 2 volts, or from 0.1 to 1 volt or preferably from 0.1 to 0.5 volts above the design voltage of the cell and typically below 5 volts vs. Li. When the oxidation scan is followed by a reduction scan, the salt will show a nearly equivalent reduction current at the original oxidation potential. As stated previously, an overcharge protection salt, which has an oxidation/reduction potential less than the design voltage of the cell, can be used but such salt can limit cell performance.

The overcharge protection salt is added to the cell, specifically to the electrolyte, in an effective amount generally sufficient to provide overcharge protection. One or more of the overcharge protection salts can be used as 100% of the electrolyte salt in a cell, or one or more of the overcharge protection salts can be added to one or more nonreversably oxidizable salt as part of the electrolyte in a cell. Typically a range from 1 to 100%, or 1 to 99%, or 1 to 95%, or 3 to 70%, or from about 10% to 30% by weight of the total salt employed in the electrolyte of the cell is the overcharge protection salt (having reversible oxidation/reduction potential) and is added to the electrolyte of the cell. When lower levels of the overcharge protection salts are employed there is the possibility that ion-migration from the overcharge protection salt may be insufficient to effect a redox shuttle within the cell and thus, for example in a lithium ion battery, excess lithium may also migrate from the cathode, resulting in an irreversible structure change. Thus, higher levels of the overcharge protection salt may be required where the design rate of discharge and recharge of the cell is high. The level of overcharge protection salt is a design parameter for the cell.

The overcharge protection salts of this invention, e.g. the partially halogenated lithium salts, such as, the lithium fluorododecaborates illustrated have an advantage over many other redox shuttle additives used in lithium or lithium ion cells (lithium cells), because these salts themselves are useful as electrolyte salts. That allows the concentration of these partially halogenated lithium salts to be dramatically increased in contrast to non-electrolyte redox shuttle additives without affecting the overall capacity and power capability of the lithium-ion cell.

The cell or battery of this invention, may be a lithium secondary cell in the 3 to 5 volt, and particularly the 4 volt class cells. The negative electrodes, or anodes for use in a cell of this invention may comprise non-graphitizing carbon, natural or artificial graphite carbon, tin oxide, lithium, silicon, or germanium compound. Any of the conventional negative electrode compositions may be used in combination with the overcharge protection salts of this invention for example, the lithium salts, particularly the fluorinated lithium dodecaborohydride salts.

The positive electrode, or cathode for use in cells can comprise any known compositions employed in cells. For lithium or lithium-ion cells, typically, a lithium transition metal/main group metal composite oxide is used as the positive electrode. The cathode in such a cell may be comprised of $LiCoO_2$, $LiNiO_2$, $LiNi_{1-x}Co_yMet_zO_2$, $LiMn_{0.5}Ni_{0.5}O_2$, $LiMn_{0.3}Co_{0.3}Ni_{0.3}O_2$, $LiFePO_4$, $LiMn_2O_4$, $LiFeO_2$, $LiMet_{0.5}Mn1.5O_4$, vanadium oxide, or mixtures of any two or more thereof, wherein Met is Al, Mg, Ti, B, Ga, Si, Ni, or Co, and wherein $0<x<0.3$, $0<z<0.5$, $0<y<0.5$. In other embodiments, the positive electrode is comprised of a spinel manganese oxide with a formula of $Li_{1+x}Mn_{2-z}Met_yO_{4-m}X_n$, wherein Met is Al, Mg, Ti, B, Ga, Si, Ni, or Co, and X is S or F, and wherein $0<x<0.3$, $0<z<0.5$, $0<y<0.5$, $0<m<0.5$ and $0<n<0.5$.

The carriers of this invention can be organic or inorganic carriers. The carriers may be aprotic. Aprotic inorganic carriers include $SO_2$, $SOCl_2$, $SO_2Cl_2$ and the like.

Aprotic organic solvents or carriers for the cells and batteries of this invention generally are anhydrous. Examples of common aprotic solvents or carriers for forming the electrolyte system in the cell include dimethyl carbonate (DMC), ethyl methyl carbonate (EMC), diethyl carbonate (DEC), methyl propyl carbonate (MPC), ethyl propyl carbonate (EPC), ethylene carbonate (EC), propylene carbonate (PC), dipropyl carbonate (DPC), bis(trifluoroethyl) carbonate, bis (pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, etc., fluorinated oligomers, methyl propionate, butyl propionate, ethyl propionate, sulfolane, 1,2-dimethoxyethane, 1,2-diethoxyethane, tetrahydrofuran, 1,3-dioxolane, 4-methyl-1,3-dioxolane dimethoxyethane, triglyme, dimethylvinylene carbonate, tetraethyleneglycol, dimethyl ether, polyethylene glycols, sulfones, and gamma-butyrolactone (GBL), vinylene carbonate, chloroethylene carbonate, methyl butyrate, ethyl butyrate, ethyl acetate, gamma-valerolactone, ethyl valerate, 2-methyl-tetrahydrofuran, 3-methyl-2-oxazolidinone, 1,3-dioxolane, 4-methyl-1,3-dioxolane, vinylethylene carbonate and 2-methyl-1,3-dioxolane.

Typically the salts present in the electrolytes are present in an amount from 0.3 to 1.2 moles per liter of the electrolyte solution; however, smaller or larger amounts are possible.

In another embodiment of cell of this invention, the electrolyte system can comprise an aprotic gel polymer carrier/solvent. Suitable gel polymer carrier/solvents include polyethers, polyethylene oxides, polyimides, polyphosphazines, polyacrylonitriles, polysiloxanes, polyether grafted polysiloxanes, derivatives of the foregoing, copolymers of the foregoing, crosslinked and network structures of the foregoing, blends of the foregoing, and the like, to which is added an appropriate ionic electrolyte salt. Other gel-polymer carrier/solvents employed in lithium cells include those prepared from polymer matrices derived from polypropylene oxides, polysiloxanes, sulfonated polyimides, perfluorinated membranes (Nafion™ resins), divinyl polyethylene glycols, polyethylene glycol-bis-(methyl acrylates), polyethylene glycol-bis(methyl methacrylates), derivatives of the foregoing, copolymers of the foregoing, crosslinked and network structures of the foregoing.

Cells of this invention may additionally comprise a separator. The separator for the cell often is a microporous polymer film. Examples of polymers for forming films include: nylon, cellulose, nitrocellulose, polysulfone, polyacrylonitrile, polyvinylidene fluoride, polypropylene, polyethylene, polybutene, and the like. Any of the polymer carriers listed above can also serve as a separator. Recently, ceramic separators have been evaluated.

The cell is not limited to particular shapes, and can take any appropriate shape such as cylindrical shape, a coin shape, a square, or prismatic shape. A lithium cell comprised of a plurality of cells is also not limited to particular capacities, and can have any appropriate capacity, for example, from the amount needed for small appliances to the capacity required for hybrid electric and electric cars. The cell of this invention may further comprise additional overcharge protection means, if desired, such as redox shuttle additives or electronic circuits, known to a person of skill in the art.

The following examples are provided to illustrate various embodiments of the invention and are not intended to restrict the scope thereof.

EXAMPLES

Example 1

Preparation of Solvents with Different Dielectric Constants 4 parts by weight of EC (dielectric constant of 89 at 25° C.), 5 parts by weight of DEC (dielectric constant of 2.8 at 25° C.)

and 2 parts by weight of PC (dielectric constant of 65 at 25° C.) were mixed together to obtain a solvent mixture with a dielectric constant of approximately 40; 3 parts by weight of EC and 7 parts by weight of DEC were mixed together to obtain a solvent mixture with a dielectric constant of approximately 28. The dielectric constants of the pure solvents were obtained from literature [Kang Xu, Chemical Reviews, 2004, 104, 4303-4417] and the dielectric constants of the solvent mixtures were estimated using mixing rules for solvent mixtures [Lithium Batteries (Science and Technology), Glolam-Abbas Nazri and Gianfranco Pistoia (Eds.), Chapter 17, M. Nazri, Kluwer Academic Publishers (2004)].

Example 2

Oxidation/Reduction of $Li_2B_{12}F_9H_3$ in EC/DEC

Figure 1:
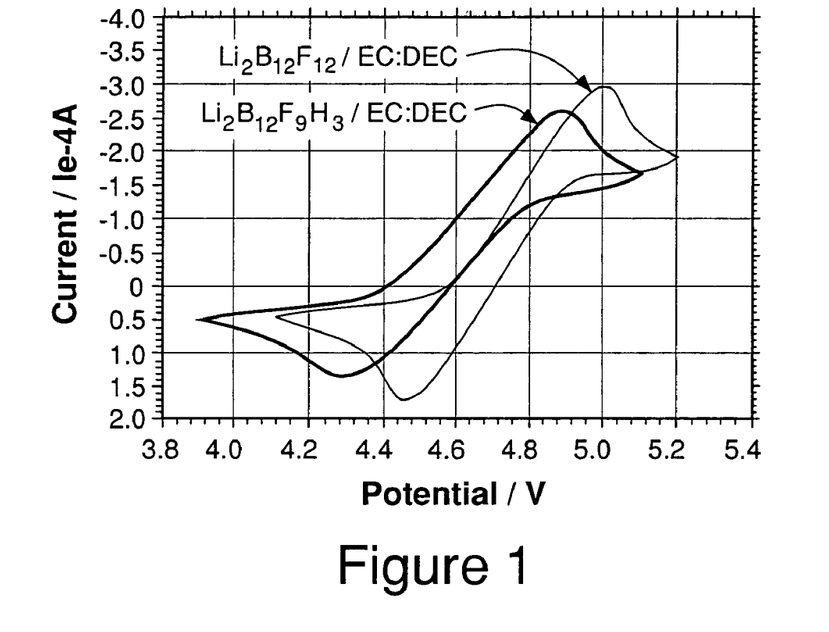
FIG. 1. Cyclic Voltammagrams of $Li_2B_{12}F_9H_3$ and $Li_2B_{12}F_{12}$ in EC:DEC (3:7). Scan rate 5 mV/sec.

Cyclic voltammetry experiments were carried out in 0.4 M $Li_2B_{12}F_9H_3$ in EC:DEC (3:7) solutions at a scan rate of 5 mV/s. Pt disk (area=0.02 cm$^2$) was used as the working electrode and Li foils were used as counter and reference electrodes. FIG. 1 and Table 1 show the results obtained. The $Li_2B_{12}FgH_3$ electrolyte has a threshold potential of about 4.32 V in EC:DEC (3:7). The threshold potential is defined here as the potential corresponding to an oxidation current density of 0.1 mA cm$^{-2}$ observed in cyclic voltammetry experiments. The $Li_2B_{12}F_9H_3$ overcharge protection salt used in this Example was a mixture of $Li_2B_{12}F_xH_{12-x}$ where x was predominantly 9 with lesser amounts of x=6, 7, 8,10, 11, and 12.

Example 3

Oxidation/Reduction of $Li_2B_{12}F_{12}$ in EC/DEC

Cyclic voltammetry experiments were carried out in 0.4 M $Li_2B_{12}F_{12}$ in EC:DEC (3:7) solutions at a scan rate of 5 mV/s. Pt disk (area=0.02 cm$^2$) was used as the working electrode and Li foils were used as counter and reference electrodes. FIG. 1 shows the result obtained. The $Li_2B_{12}F_{12}$ electrolyte has a threshold potential of about 4.5 V in EC:DEC (3:7). Based upon Example 2 and 3 data, then, one might expect both $Li_2B_{12}F_9H_3$ and $Li_2B_{12}F_{12}$ to be well suited as redox shuttles in a 4 volt lithium ion cell. Additionally, comparing the threshold potentials for this example and example 2 indicates that $Li_2B_{12}F_9H_3$ has a lower threshold potential than $Li_2B_{12}F_{12}$; therefore, having fewer fluorines on a borate cluster should provide a lower threshold potential. The $Li_2B_{12}F_{12}$ overcharge protection salt used in this Example was a mixture of $Li_{12}B_{12}F_xH_{12-x}$ where x was predominantly 12 with lesser amounts of x=10 and 11.

Example 4

Oxidation/Reduction of $Li_2B_{12}F_9H_3$ in PC/GBL

Cyclic voltammetry experiments were carried out similar to Example 2 except 0.4 M $Li_2B_{12}F_9H_3$ in PC:GBL (1:1) solution was used. The threshold potential of $Li_2B_{12}F_9H_3$ was higher in PC/GBL than in EC/DEC as shown in Table 1. The $Li_2B_{12}F_9H_3$ overcharge protection salt used in this Example was a mixture of $Li_2B_{12}F_9H_{12-x}$ where x was predominantly 9 with lesser amounts of x=6, 7, 8,10,11, and 12.

Example 5

Oxidation/Reduction of $Li_2B_{12}F_9H_3$ in EC/PC

Cyclic voltammetry experiments were carried out similar to Example 2 except 0.4 M $Li_2B_{12}F_9H_3$ in EC:PC (1:1) solution was used. Table 1 summarizes the result obtained. The threshold potential of $Li_2B_{12}F_9H_3$ was higher in EC/PC compared to that of Example 2 and Example 4. The $Li_2B_{12}F_9H_3$ overcharge protection salt used in this Example was a mixture of $Li_2B_{12}F_xH_{12-x}$ where x was predominantly 9 with lesser amounts of x=6, 7, 8, 10, 11, and 12.

Example 6

Oxidation/Reduction of $Li_2B_{12}FgH_3$ in EC/DEC/PC

Cyclic voltammetry experiments were carried out similar to Example 2 except 0.4 M $Li_2B_{12}F_9H_3$ in EC:DEC:PC (4:5:2) solution was used. Table 1 summarizes the result obtained. The threshold potential of $Li_2B_{12}F_9H_3$ was higher in EC/DEC/PC compared to that of Example 2 but lower than that of Examples 4 and 5. The $Li_2B_{12}F_9H_3$ overcharge protection salt used in this Example was a mixture of $Li_2B_{12}F_xH_{12-x}$ where x was predominantly 9 with lesser amounts of x=6, 7, 8,10,11, and 12.

Example 7

Chronopotentiometry of $Li_2B_{12}F_9H_3$ in EC/DEC, EC/PC and EC/DEC/PC

Figure 2:
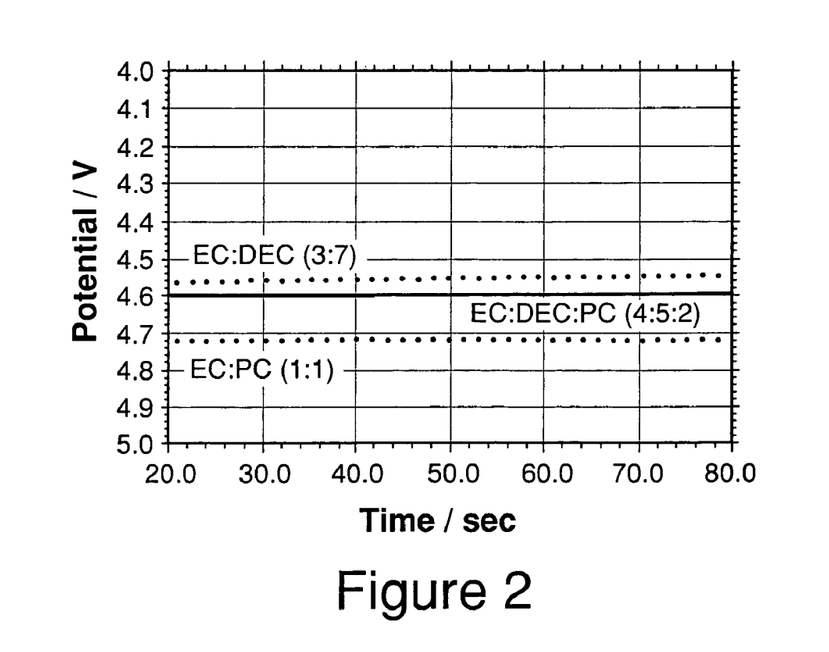

Chronopotentiometry experiments were carried out in 0.4 M $Li_2B_{12}F_9H_3$ dissolved in different carriers: EC:DEC (3:7), EC:PC (1:1) and EC:DEC:PC (4:5:2). A constant current density of 1 mA cm$^{-2}$ was applied to an electrochemical cell similar to the one described in Example 2. The potential of the working electrode was recorded as a function of time and results for the three above mentioned electrolyte solutions are shown in FIG. 2. The potential stabilizes to different values depending on the solvent mixture. While EC:PC solvent mixture had the highest potential of 4.71 V vs Li/Li$^+$, the EC:DEC solvent mixture had the lowest at 4.52 V vs Li/Li$^+$. The EC:DEC:PC solvent mixture yielded a potential of 4.58 V vs Li/Li$^+$. The $Li_2B_{12}F_9H_3$ overcharge protection salt used in this Example was a mixture of $Li_2B_{12}F_xH_{12-x}$ where x was predominantly 9 with lesser amounts of x=6, 7, 8,10, 11, and 12.

Example 8

Chronoamperometry in $Li_2B_{12}F_9H_3$ in EC/DEC and EC/DEC/PC

Figure 3:
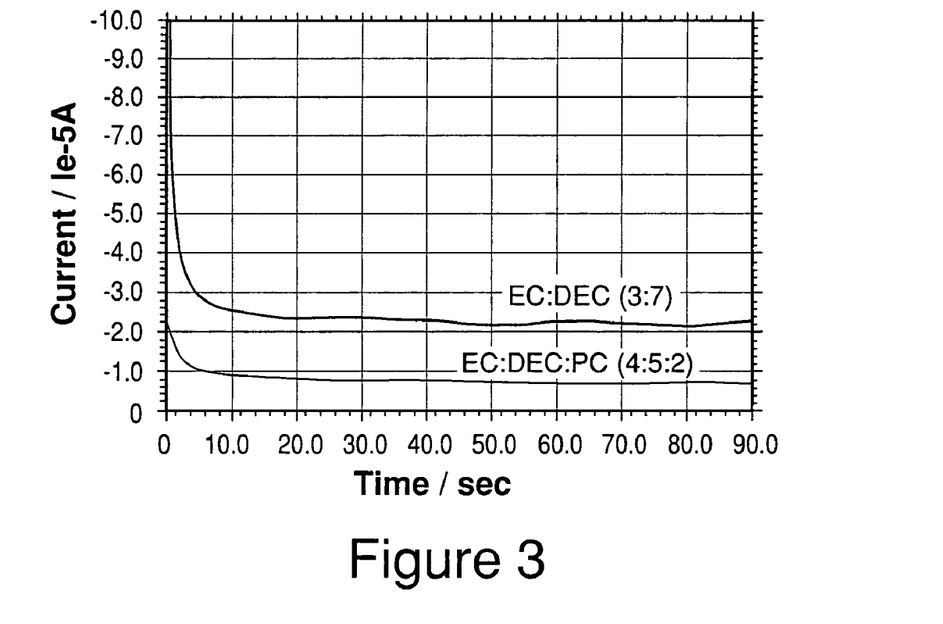

Chronoamperometry experiments were carried out in 0.4 M $Li_2B_{12}F_9H_3$ dissolved in different solvents: EC:DEC (3:7) and EC:DEC:PC (4:5:2). A constant potential of 4.3 V vs Li/Li$^+$ was applied to an electrochemical cell similar to the one described in Example 2 and the temperature was maintained at 80° C. The current was recorded as a function of time and is shown in FIG. 3. Higher oxidation currents were observed in EC:DEC solvent mixture compared to EC:DEC:PC solvent mixture. This example indicates that $Li_2B_{12}F_9H_3$ is easier to oxidize in EC:DEC than it is to oxidize in the higher dielectric EC:DEC:PC solvent mixture. The $Li_2B_{12}F_9H_3$ overcharge protection salt used in this Example was a mixture of $Li_2B_{12}F_xH_{12-x}$ where x was predominantly 9 with lesser amounts of x=6, 7, 8,10,11, and 12.

Example 9

Oxidation/Reduction Potential Obtained from Calculations

Figure 4:
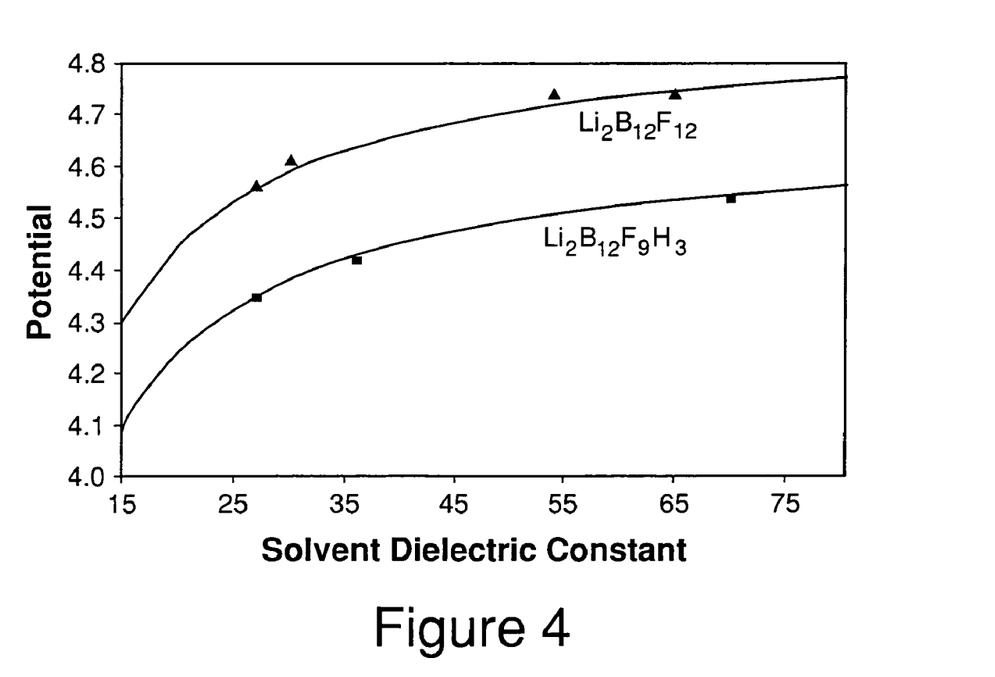

Based on the results shown in the examples above, an attempt was made to provide a method to predict the oxidation/reduction potentials for a given electrolyte solution. The fluoro dodecaborate anions in solution were modeled as spherical shells containing a certain charge which then changes during the oxidation/reduction process. The simple Born Equation (M. Born, Z. Phys., 1920, 1, 45) for the solvation energy was used to derive an equation for the shift in an oxidation/reduction potential with changes in solvent, $$\delta E(\alpha, \beta) = \frac{e^2 N_{av}}{8\pi\varepsilon_0}\left(\frac{1}{k_\beta} - \frac{1}{k_\alpha}\right)\left(\frac{z_2^2}{r_2} - \frac{z_1^2}{r_1}\right) = B\left(\frac{1}{k_\beta} - \frac{1}{k_\alpha}\right)\left(\frac{z_2^2}{r_2} - \frac{z_1^2}{r_1}\right)$$

where $\delta E(\alpha,\beta)$ is the change in potential for the oxidation/reduction process (which takes the molecule or ion from state 1 to state 2) when moving it from solvent $\alpha$ to solvent $\beta$; e is the electron charge, $N_{av}$ is Avagadro's number, $\epsilon_0$ is the permittivity of free space, $k_\gamma$ is the dielectric constant of solvent $\gamma$, $z_i$ is the charge (as a multiple of the electron charge) on the oxidized/reduced species in state i, $r_i$ is the effective Born radius in state i, and B has the numerical value 7.20 eV-Å or equivalently 695 (kJ/mol)Å. It is sometimes useful, as was done here, to assume that the effective radius is the same for the initial and final states of the ions: $r_1=r_2$. A single effective Born radius ($r_1=r_2=2.5$Å) was determined by fitting the equation to threshold potential data which was experimentallly determined for $Li_2B_{12}F_9H_3$ and $Li_2B_{12}F_{12}$ in various carriers as described in Examples 2-6. The resulting equation and effective Born radius were used to predict variations in the threshold potential of the fluoro dodecaborate anions with changes in the solvent dielectric constant. FIG. 4 shows the threshold potential of $Li_2B_{12}F_9H_3$ and $Li_2B_{12}F_{12}$ electrolytes as a function of solvent dielectric constant. Based on the curves in FIG. 4, it is shown that the dielectric constant of a solvent or a mixture of solvents has an affect on the oxidation potential of the overcharge protection salt in the electrolyte solution. Therefore the dielectric constant of the carrier can be adjusted by changing the composition of the carrier to tune the oxidation potential of the overcharge protection salt to optimize the cell design. Additionally, FIG. 4 shows that the threshold potential varies with x in $Li_2B_{12}F_xH_{12-x}$.

Comparative Example 1

Impact of Solvent Dielectric on 1,2-di-methoxy-4-bromo-benzene as an Overcharge Protection Additive The use of 1,2-di-methoxy-4-bromo-benzene as an overcharge protection redox shuttle compound was disclosed in U.S. Pat. No. 5,763,119. 0.1 M 4-bromo-1,2-dimethoxybenzene was added to 1.0 M $LiPF_6$ in EC/DEC (3:7) (dielectric constant=28) solution and to 1.0 M $LiPF_6$ in PC solution (Dielectric constant ~65). Cyclic voltammetry experiments were carried out in an electrochemical cell similar to the one described in Examples 2-6. The scan rate was 20 mV/s. The oxidation threshold potential in both EC/DEC and PC containing solvents was 4.18 V. The solvent dielectric had no impact on the oxidation threshold potential.

Example 10

Overcharge in a Lithium-Ion cell containing 0.4M $Li_2B_{12}F_9H_3$ in 3:7 EC:DEC A coin type cell battery (diameter 20 mm, thickness 3.2 mm) comprised of a positive electrode, negative electrode, separator and electrolyte was prepared at room temperature. The positive electrode, consisted of $LiCo_{0.8}Ni_{0.15}Al_{0.05}O_2$ (positive electrode active material) 84% by weight, carbon black (conducting agent) 4% by weight, SFG-6 graphite (conducting agent) 4% by weight, polyvinylidene fluoride (binder) 8% by weight on an aluminum foil current collector. The negative electrode, consisted of MAG-10 graphite (anode active material) 92% by weight, polyvinylidene fluoride (binder) 8% by weight on a copper foil current collector. The separator was Celgard™ 3501, (available from Celgard Inc.) a microporous polypropylene film.

The electrolyte was a 0.4 M solution of $Li_2B_{12}F_9H_3$ in 3:7 by weight EC:DEC. The cell was charged by a constant current of 2 mA (1C-rate) to a voltage of 4.1V followed by a discharge current of 2 mA (1C-rate) to 3V. The cell was then overcharged by a constant current of 2 mA (1C-rate) to a voltage greater than 4.1V. A voltage plateau at approximately 4.5V was observed. The $Li_2B_{12}F_9H_3$ overcharge protection salt used in this Example was a mixture of $Li_2B_{12}F_xH_{12-x}$ where x was predominantly 9 with lesser amounts of x=6, 7, 8, 10, 1 1, and 12.

Example 11

Overcharge in a Lithium-Ion Cell Containing 0.4M $Li_2B_{12}F_9H_3$ in 4:5:2 EC:DEC:PC A cell was prepared and charged according to the procedure of Example 10, except that the electrolyte comprised a 0.4 M solution of $Li_2B_{12}F_9H_3$ in 4:5:2 by weight, EC:DEC:PC, which has a dielectric constant of ~40. A voltage plateau of approximately 4.6 V was observed. The $Li_2B_{12}F_9H_3$ overcharge protection salt used in this Example was a mixture of $Li_2B_{12}F_xH_{12-x}$ where x was predominantly 9 with lesser amounts of x=6, 7, 8, 10, 11, and 12.

Example 12

Overcharge in a lithium-Ion Cell Containing 0.4M $Li_2B_{12}F_9H_3$ in EC:PC

A cell was prepared and charged according to the procedure of Example 10, except that the electrolyte comprised a 0.4 M solution of $Li_2B_{12}F_9H_3$ in 1:1 by weight, EC:PC, which has a dielectric constant of ~74. A voltage plateau of approximately 4.8 V was observed. The $Li_2B_{12}F_9H_3$ overcharge protection salt used in this Example was a mixture of $Li_2B_{12}F_xH_{12-x}$ where x was predominantly 9 with lesser amounts of x=6, 7, 8, 10, 11, and 12.

Table 1. Threshold potentials of $Li_2B_{12}F_9H_3$ and $Li_2B_{12}F_{12}$ in different carriers

TABLE 1

|  | EC:DEC (3:7) | EC:DEC:PC (4:5:2) | PC:GBL (1:1) | EC:PC (1:1) |
|---|---|---|---|---|
| Estimated Dielectric Constant | 28 | 40 | 54 | 74 |
| $Li_2B_{12}F_9H_3$ Threshold potential | 4.35 | 4.38 | 4.42 | 4.54 |
| $Li_2B_{12}F_{12}$ Threshold Potential | 4.51 | — | 4.66 | — |

Comparative Example 2

Overcharge Evaluation of Lithium Secondary Cell With $LiPF_6$

The cycling characteristics of a 4 volt class lithium cell employing a $LiNi_{0.8}Co_{0.15}Al_{0.5}O_2$ cathode vs. a graphite anode having as the electrolyte a 0.4 molar solution of lithium hexafluorophosphate in a 3:7 weight mixture of ethylene carbonate (EC) and ethyl methyl carbonate were determined. The cell was cycled between 3 volts and 5.5 volts using a constant current charge and discharge at a current density of 0.67 mA/cm². The design voltage of this cell is about 4.3 volts. It is typical of lithium cells normally susceptible to overcharge conditions.

Figure 5:
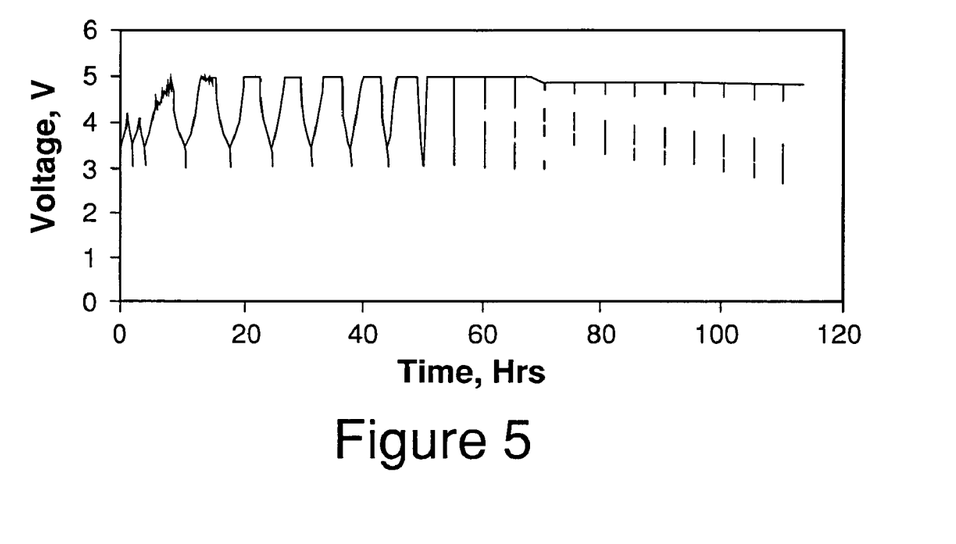
FIGS. 5-8 are plots of overcharge cycling characteristics of cells having different electrolyte solutions

FIG. 5 shows that the lithium hexafluorophosphate, a commonly used lithium electrolyte salt in lithium-based cells for cell phones, does not afford overcharge protection. At a current density of 10 mA and after only 6 cycles the cell capacity completely faded and the cell could not be charged or discharged further.

The results also show that the cell, when successively overcharged, became completely inoperative after about 50 to 60 hours. The lithium salt, lithium hexafluorophosphate, is not reversibly oxidizable and continued overcharge led to irreversible capacity loss from destruction of the cathode.

Example 13

Evaluation of Lithium Secondary Cell with $LiPF_6$ Including 3% by Weight $Li_2B_{12}F_{12}$ The procedure of Comparative Example 2 was repeated except that 3% by weight of $Li_2B_{12}F_{12}$ (average 10-12 fluorine atoms) was added to determine whether it would provide some overcharge protection to the cell. Cycling characteristics of the cell using $LiNi_{0.8}Co_{0.15}Al_{0.05}O_2$ vs. Graphite having as electrolyte $LiPF_6$/EC:EMC (3:7) +3 wt % $Li_2B_{12}F_{12}$ additive by weight of total salt. The cell was cycled between 3volt and 5.5volt using a constant current (10 mA) charge and discharge at a current density of 0.67 mA/cm². The results are shown in FIG. 6.

Figure 6:
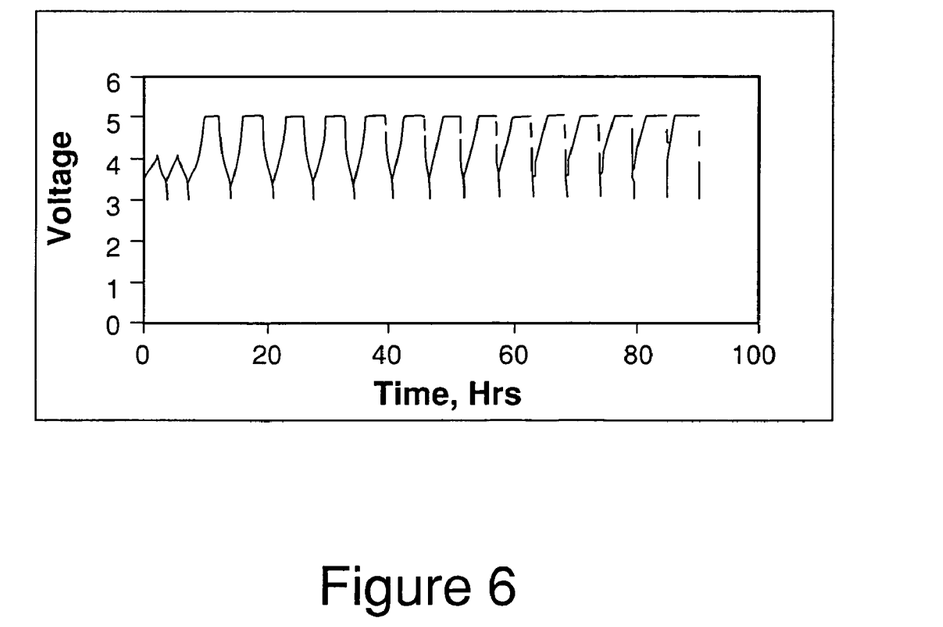

FIG. 6 shows that the cell was effectively cycled through 90 hours without failure of the cell. However, there was some reduction in capacity suggesting that although there was some overcharge protection afforded, there was insufficient lithium dodecafluoroborate salt in the electrolyte to provide a fully reversible oxidation/reduction shuttle for that cell design.

Example 14

Salt Evaluation of Lithium Secondary Cell with $LiPF_6$ Salt Including $Li_2B_{12}F_{12}$ The procedure of Example 13 was repeated except that a 1.2 M $LiPF_6$/EC:DEC (1:1) solution was mixed with an equivalent volume of 0.4 M $Li_2B_{12}F_{12}$/EC:DMC(3:7) solution. Here the $Li_2B_{12}F_{12}$ additive corresponds to ~50% by weight of the total salt mixture. The cell was cycled between 3 volts and 5.5 volts using a constant current (10 mA) charge and discharge at a current density of 0.67 mA/cm². The results are shown in FIG. 7.

Figure 7:
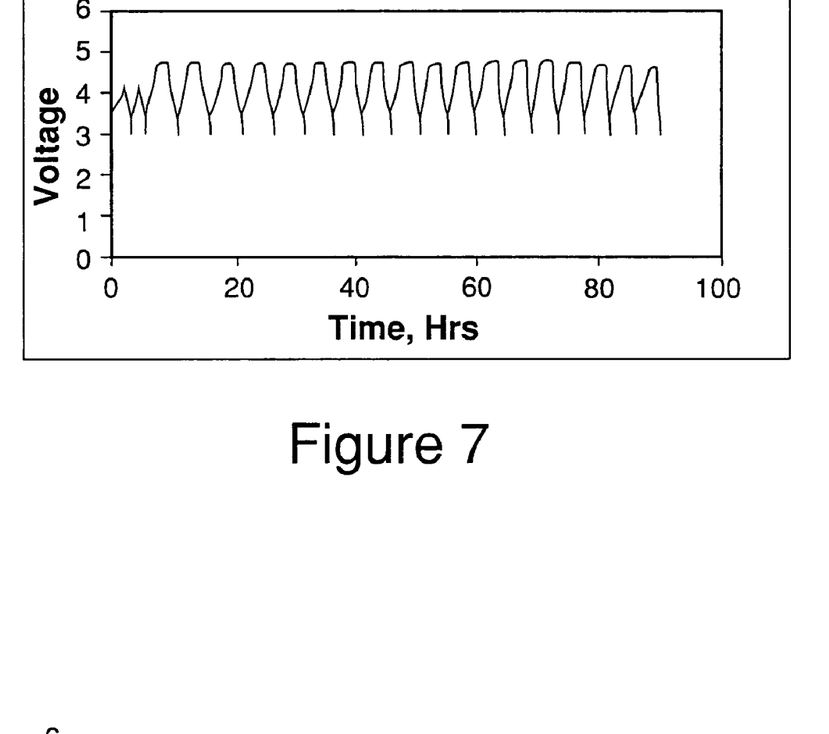

The results in FIG. 7 show when using 0.2M $Li_2B_{12}F_{12}$ in $LiPF_6$ electrolyte, the cell could not be overcharged to the set voltage of 5.5 volts, and a flat plateau at around 4.6 volts was observed due to the oxidation of the overcharge protection salt. For this cell design, the use of $Li_2B_{12}F_{12}$ salt in a lithium secondary cell with $LiPF_6$ salt afforded overcharge protection and was present in an amount sufficient to effect a redox shuttle during the overcharge condition.

Example 15

The procedure of Example 13 was repeated except that the electrolyte comprised 0.4M $Li_2B_{12}F_{12}$ in 3:7 EC:DMC. The cell was cycled between 3V and 5.5V using a constant current (10 mA) charge and discharge at a current density of 0.67 mA/cm². The results are shown in FIG. 8.

Figure 8:
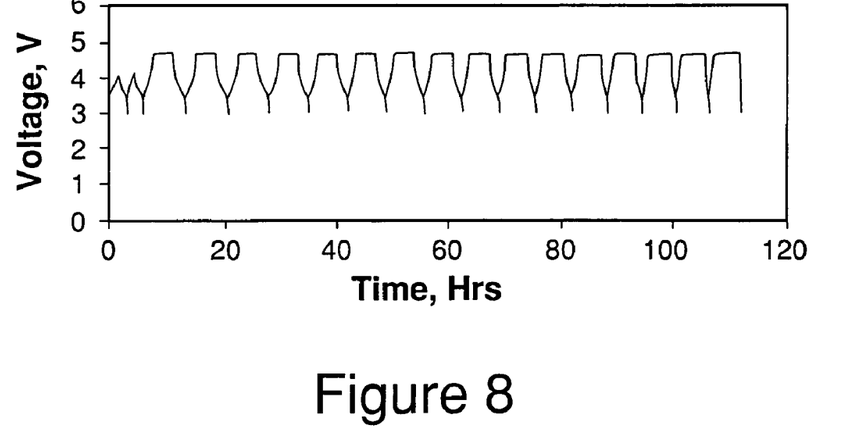

The results in FIG. 8 show that when a 0.4M $Li_2B_{12}F_{12}$ in 3:7 EC:DMC is used the cell could not be overcharged to the set voltage of 5.5 V and a flat plateau at around 4.6 V was observed due to oxidation of the additive. The result also shows that $Li_2B_{12}F_{12}$ as the only electrolyte salt is sufficient to allow charging and discharging of the lithium ion cell.

Example 16

Voltammetric Tests of Various Lithium Based Salts

Various lithium borate cluster salts were tested in accordance with the procedure of Example 3 for the purpose of determining whether they would be suitable candidates to provide overcharge protection in a cell, for example, a lithium ion cell.

TABLE 2

Oxidation Potentials of Lithium Electrolytes

| Compound | Molecular wt. | Oxidation Potential $E_{1/2}$ (V) vs. Li; (reversible; yes/no/nd) |
|---|---|---|
| $Li_2B_{12}Cl_{12}$ | 569.5 | >5.3 (nd) |
| $Li_2B_{12}F_{12}$ | 371.6 | 4.9; (yes) |
| $Li_2B_{12}F_xH_{12-x}(x \geq 10)$ Average x = 11 | 353.6 | 4.7; (yes) |
| $Li_2B_{12}F_xCl_{12-x}(x \geq 10)$ Average x = 11 | 388.1 | 5.1; (yes) |
| $Li_2B_{12}F_xH_{12-x}(x \geq 10)$ Average x = 11 Contains 5% $Li_2B_{12}F_x(OH)_{12-x}$ (x = 10,11) $B_{12}F_{10}(OH)_2^{2-}$ | ~353.6 | 4.2; (yes) |
| $Li_2B_{12}F_5H_7$ | 248 | 4.6; (yes) |
| $Li_2B_{12}F_3H_9$ | 212 | 4.5; (no) |
| $B_{10}Cl_{10}^{2-}$* | | 4.1; (yes) |

*$B_{10}Cl_{10}^{2-}$ is a literature value

The results in Table 2 show that a number of lithium borate cluster salts are well suited for use as an overcharge additive. All but the salt, $Li_2B_{12}F_3H_9$, exhibited reversible oxidation/reduction characteristics. It is believed the level of halogen in this salt was too low. For example the salt, $Li_2B_{12}F_5H_7$, exhibited a similar oxidation potential but was more reversible.

In summary the Examples show that overcharge protection can be imparted to cells and batteries by incorporating an overcharge protection salt that is reversibly oxidizable at a voltage within the design range of a 3-5 volt class cell.

The examples also show that the overcharge protection salts when present in sufficient amount can act as a continuous redox shuttle thereby affording overcharge protection without a significant reduction in capacity, or power capability. Lesser quantities of overcharge protection salts provide some overcharge protection but may fail as a continuous redox shuttle if not present in the cells at a sufficient concentration, particularly if the cells are operating at higher current densities. The Examples 2-13 also show that these salts, unlike other redox shuttle additives shown in comparative Example 1, allow the potential of the overcharge protection to be tuned based on the dielectric constant of the carrier.

The invention claimed is:

1. An electrochemical cell comprising a negative electrode, a positive electrode, and an electrolyte, said electrolyte comprising at least one aprotic organic carrier and at least one salt wherein at least one salt provides overcharge protection, wherein said salt that provides overcharge protection comprises: i) at least one lithium fluoroborate selected from the group consisting of the compounds represented by the formula:

$$Li_2B_{10}F_xZ_{10-x}$$

wherein x is at least 3 and Z represents H, Cl, Br, or OR, where R=H, $C_{1-8}$ alkyl, fluoroalkyl or aryl, ii) has a reversible oxidation potential from about 0.1 to about 2 volts above the voltage of the cell, and iii) comprises from about 3 to about 70% by weight of the total weight of the salt.

2. The cell of claim 1, further comprising a carrier, wherein the salt that provides overcharge protection is oxidized at a potential that changes with the dielectric constant of the carrier.

3. The cell of claim 1 wherein said electrolyte further comprises a nonreversibly oxidizable salt.

4. The cell of claim 3, wherein said nonreversibly oxidizable salt is selected from the group consisting of lithium perchlorate, lithium hexafluorophosphate, lithium hexafluoroarsenate, lithium hexafluoroborate, lithium trifluoromethylsulfonate, lithium tetrafluoroborate, lithium tetrakis(pentafluorophenyl)borate, lithium bromide, and lithium hexafluoroantimonate, $LiB(C_6H^5)_4$, $LiN(SO_2CF_3)_2$, $LiN(SO_2CF_2CF_3)$ and lithium bis(chelato)borates or a mixture of any two or more thereof.

5. The cell of claim 1 wherein the carrier comprises at least one member selected from the group consisting of ethylene carbonate (EC), propylene carbonate (PC), dimethyl carbonate (DMC), ethyl methyl carbonate (EMC), diethyl carbonate (DEC), methyl propyl carbonate (MPC), ethyl propyl carbonate (EPC), dipropyl carbonate (DPC), bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, fluorinated oligomers, methyl propionate, butyl propionate, ethyl propionate, sulfolane, 1,2-dimethoxyethane, 1,2-diethoxyethane, tetrahydrofuran, 1,3-dioxolane, 4-methyl-1,3-dioxolane dimethoxyethane, triglyme, dimethylvinylene carbonate, vinylene carbonate (VC), vinylethylene carbonate (VEC), chloroethylene carbonate, tetraethyleneglycol, dimethyl ether, polyethylene glycols, sulfones, gamma-butyrolactone (GBL), methyl butyrate, ethyl butyrate, ethyl acetate, gamma-valerolactone, ethyl valerate, 2-methyl-tetrahydrofuran, 3-methyl-2-oxazolidinone, 1,3-dioxolane, 4-methyl-1,3-dioxolane, and 2-methyl-1,3-dioxolane.

6. The cell of claim 4 wherein the nonreversibly oxidizable salt comprises lithium hexafluorophosphate.

7. The cell of claim 5 wherein the aprotic organic carrier comprises vinylene carbonate (VC).

8. The electrochemical cell of claim 1 wherein the carrier comprises at least one member selected from the group consisting of EC, DEC, GBL, PC, vinylene carbonate and mixtures thereof.

9. The electrochemical cell of claim 1 further comprising at least one separator.

10. The electrochemical cell of claim 1 wherein the negative electrode comprises at least one member selected from the group consisting of non-graphitizing carbon, and natural or artificial graphite carbon.

11. The electrochemical cell of claim 1 wherein the positive electrode comprises at least one lithium composite oxide.

12. The electrochemical cell of claim 1 wherein x is at least about 8.

13. The electrochemical cell of claim 1 wherein the lithium fluoroborate comprises $Li_2B_{10}F_{10}$.

14. The electrochemical cell of claim 1 wherein x is at least 8 and Z is Br.

15. The electrochemical cell of claim 1 wherein the salt has a reversible oxidation potential from about 0.1 to about 0.5 volts above the voltage of the cell.

* * * * *

UNITED STATES PATENT AND TRADEMARK OFFICE
CERTIFICATE OF CORRECTION

PATENT NO. : 7,785,740 B2
APPLICATION NO. : 11/097810
DATED : August 31, 2010
INVENTOR(S) : Khalil Amine et al.

It is certified that error appears in the above-identified patent and that said Letters Patent is hereby corrected as shown below:

Column 17, Line 32

In claim 4 delete "$LiB(C_6H^5)_4$," and insert --$LiB(C_6H_5)_4$,--

Signed and Sealed this

Twenty-third Day of November, 2010

David J. Kappos
*Director of the United States Patent and Trademark Office*